United States Patent [19]
Butt

[11] Patent Number: 6,101,528
[45] Date of Patent: *Aug. 8, 2000

[54] METHOD AND APPARATUS FOR DISCOVERING SERVER APPLICATIONS BY A CLIENT APPLICATION IN A NETWORK OF COMPUTER SYSTEMS

[75] Inventor: Alan Butt, Orem, Utah

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,997

[22] Filed: Nov. 28, 1997

Related U.S. Application Data

[63] Continuation of application No. 08/624,773, Mar. 27, 1996, abandoned.

[51] Int. Cl.[7] ........................... G06F 13/00
[52] U.S. Cl. ............... 709/203; 709/235; 709/245
[58] Field of Search .................. 709/203, 229, 709/235, 245

[56] References Cited

U.S. PATENT DOCUMENTS

| | | | |
|---|---|---|---|
| 4,800,488 | 1/1989 | Agrawal et al. | 395/800 |
| 5,167,035 | 11/1992 | Mann et al. | 395/182.02 |
| 5,581,704 | 12/1996 | Barbara et al. | 395/200.09 |
| 5,596,574 | 1/1997 | Perlman | 370/389 |
| 5,619,716 | 4/1997 | Nonaka et al. | 395/712 |
| 5,627,766 | 5/1997 | Beaven | 364/551.01 |
| 5,628,005 | 5/1997 | Hurvig | 395/608 |
| 5,642,515 | 6/1997 | Jones et al. | 395/727 |
| 5,644,717 | 7/1997 | Clark | 395/200.54 |
| 5,655,081 | 8/1997 | Bonnell et al. | 395/200.32 |
| 5,659,787 | 8/1997 | Schieltz | 395/200.56 |
| 5,680,551 | 10/1997 | Martino, II | 395/200.68 |
| 5,687,320 | 11/1997 | Wiley et al. | 395/200.75 |
| 5,862,326 | 1/1999 | Bapat | 395/200.33 |

OTHER PUBLICATIONS

Ping Module of SunOS 5.4, Sep. 14, 1992 2 pgs.
Request for Comments: 887, Resource Location Protocol, Network Working Group, Dec. 1983.

*Primary Examiner*—Meng-Ai T. An
*Assistant Examiner*—Gautam R. Patel
*Attorney, Agent, or Firm*—Blakely, Sokoloff, Taylor & Zafman LLP

[57] ABSTRACT

In a network of computer systems, each node having client applications that perform server application discovery is provided with a client discovery service having a first collection of functions, including a first registration function for registering discovery callback procedures of client applications, and a send function for sending discovery packets on behalf of the client applications. Additionally, each node having server applications that are interested in being discovered by client applications is provided with a server discovery service having a second collection of functions, including a second registration function for registering server applications interested in being discovered, and a respond function for sending discovery response packets on behalf of the registered server applications. During operation, these functions facilitate the client applications in performing server application discovery in a manner that reduces network traffics.

40 Claims, 12 Drawing Sheets

METHOD AND APPARATUS FOR DISCOVERING SERVER APPLICATIONS BY A CLIENT APPLICATION IN A NETWORK OF COMPUTER SYSTEMS

This is a continuation of application No. 08/624,773, filed Mar. 27, 1996, now abandoned.

BACKGROUND OF THE INVENTION

1. Field of the Invention

The present invention relates to the field of computer systems. More specifically, the present invention relates to the art of client/server computing in a network of computing systems.

2. Background Information

Networking of computer systems, and Client/Server Computing are known in the art. Conventionally, a client application discovers whether certain server applications are available in a network of computer systems by broadcasting discovery messages to all the nodes in the network. The server applications on the various nodes respond to the broadcast messages with response messages identifying their presence. Typically, each client application in the network would perform the discovery process a number of times in the course of its execution. As technology continues to advance, the number of nodes interconnected in a typical network, and the number of client and server applications executing on these nodes have increased significantly. As a result, the volume of network traffic incurred by client applications discovering server applications have reached an intolerable level in many medium to large networks. It is no longer uncommon for network administrators to impose filtering to filter out "low priority" network traffics, which often include server application discovery and response messages.

Thus, it is desirable to have a more efficient approach for client applications to discover server applications in a network of computer systems. As will be described in more detail below, the present invention achieves these and other desirable results.

SUMMARY OF THE INVENTION

In accordance with the present invention, each node having client applications that perform server application discovery is provided with a client discovery service having a first collection of functions, including a first registration function for registering discovery callback procedures of client applications, and a send function for sending discovery packets on behalf of the client applications. Additionally, each node having server applications that are interested in being discovered by client applications is provided with a server discovery service having a second collection of functions, including a second registration function for registering server applications interested in being discovered, and a respond function for sending discovery response packets on behalf of the registered server applications.

During operation, a client application performs server application discovery by sending discovery packets to well known sockets or ports of the nodes or targets of interest, one target at a time, at a rate slower than a predetermined maximum rate, utilizing the send discovery packet function of the client discovery service. The server discovery service on each of the nodes continuously listens to the well known socket/port on the corresponding node for arrival of discovery packets. Upon detecting the arrival of a discovery packet, and determining that the server application of interest is one of its registered server applications, the respond function of the server discovery service responds to the originating client discovery service of the discovery packet with a discovery response packet, informing the client application about the existence of the server application of interest, and how to communicate with the particular server application. Upon receipt of a discovery response packet, a client discovery service notifies the addressee client application by calling its registered callback procedure.

In one embodiment, instead of sending discovery packet to one target at a time, a client application broadcasts a discovery packet to all nodes each time. However, the client application keeps track of the responded nodes, and appends the responded nodes in an exception list in each subsequent rebroadcast. The client application further stops broadcasting after a predetermined number of rebroadcast. In this embodiment, a server discovery service would respond only if its node is not a member of the appended exception list.

In one embodiment, each callback procedure further maintains a list of responded nodes, and the client application supports re-discovery against the previously responded nodes only, using the maintained list.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
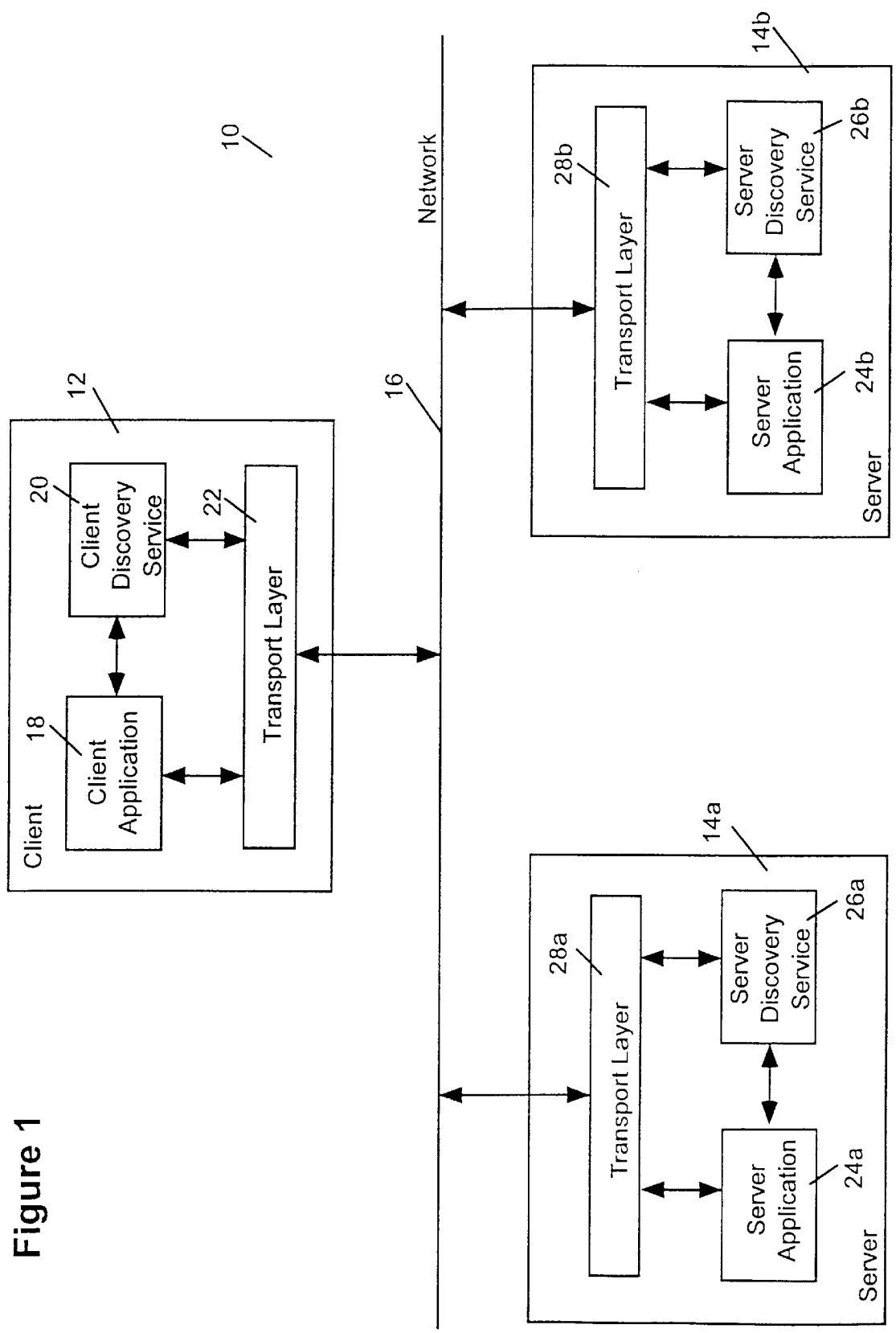
FIG. 1 illustrates an exemplary network of computer systems incorporated with the teachings of the present invention.

Referring now to FIG. 1, wherein an exemplary network of computer systems incorporating the teachings of the present invention is shown. As illustrated, exemplary network 10 comprises a client node 12, a first server node 14a and a second server node 14b, interconnected to each other via network medium 10. Network medium 10 is intended to represent a broad category of networking cables and their associated switching, repeater, and/or delay elements, suitable for high speed local area network (LAN) or slower speed wide area network (WAN) known in the art.

Client node 12 includes client application 18, client discovery service 20, and transport layer 22. Client application 18 performs server application discovery in accordance to the teaching of the present invention, utilizing services provided by client discovery service 20. Client application 18 includes in particular a discovery scan function and a discovery callback function or procedure for performing the server application discovery process in the required manner. Otherwise, client application 18 is intended to represent a broad category of client applications known in the art. Client discovery service 20 includes in particular a first registration function for registering the callback procedure of client application 18, and a send discovery packet function for sending discovery packets on behalf of client application 18. Transport layer 22 performs the conventional function of physically sending and receiving packets over network medium 16. Transport layer 22 is intended to represent a broad category of transport layers for the various protocols known in the art. For example, Internetwork Packet eXchange (IPX) and User Datagram Protocol/Internet Protocol (UDP/IP).

Each server node 14a/14b includes server application 24a/24b, server discovery service 26a/26b and transport layer 28a/28b. Server application 24a/24b participates in the server application discovery process in accordance to the teachings of the present invention, through server discovery service 26a/26b. Except for the incorporated teachings of the present invention, server application 24a/24b is otherwise intended to represent a broad category of server applications known in the art. Server discovery service 26a/26b includes in particular a second registration function for registering server applications 24a/24b interested to be discovered, and a discovery respond function for listening for discovery packets, and responding with discovery response packets on behalf of registered server applications 24a/24b. Transport layer 28a/28b performs the same function performed by transport layer 22.

Before describing these elements and the manner they cooperate with each other other in further detail, it should be noted that while for ease of explanation, only client node 12 and server nodes 14a and 14b are illustrated in FIG. 1, as will be readily apparent to those skilled in the art, based on the descriptions to follow, the present invention may be practiced with one or more client nodes and one or more server nodes. Similarly, while only one client/server application is illustrated in each of the client/server node, the present invention may be practiced with one or more client/server application on each client/server node.

Figure 2:
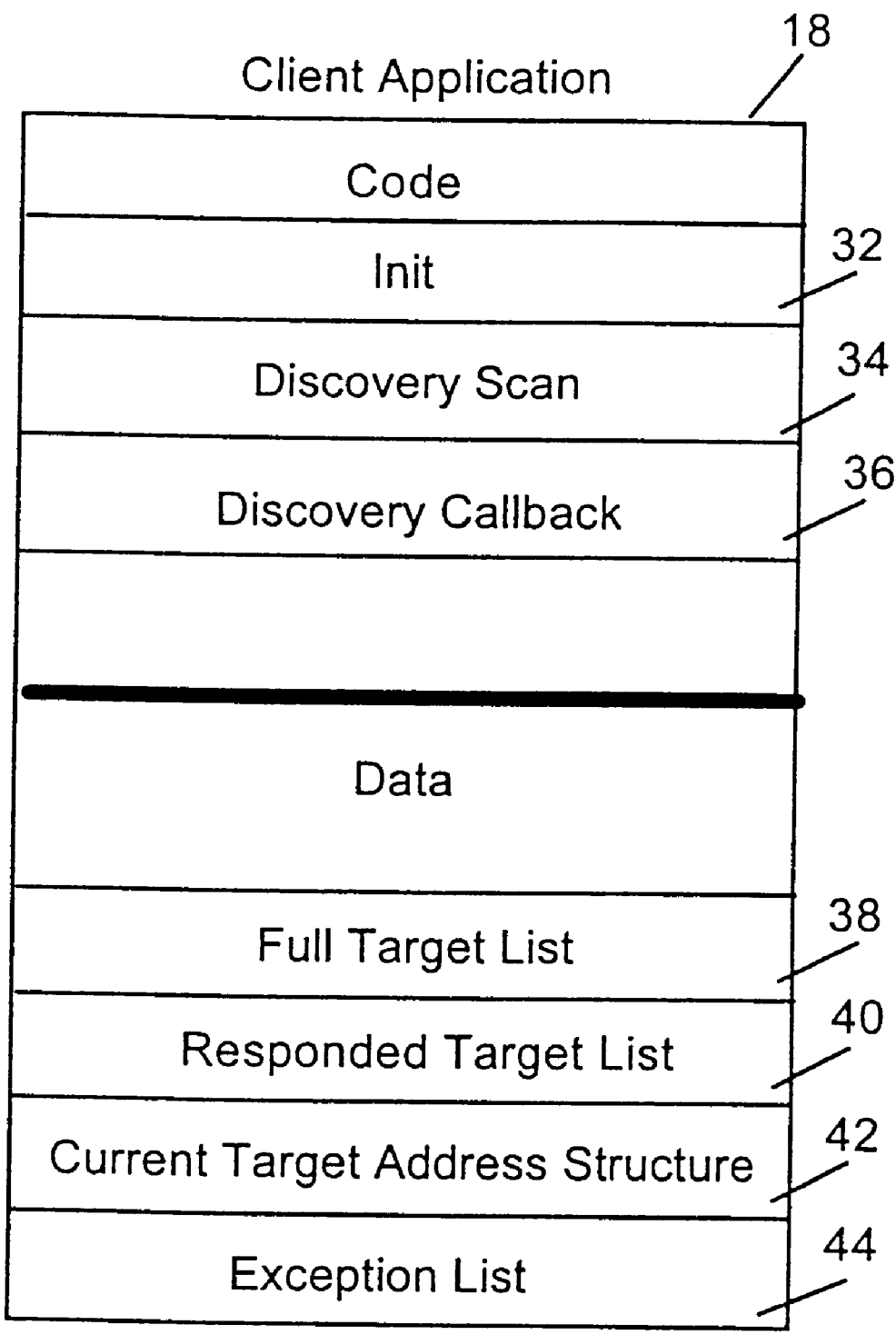
FIG. 2 illustrates one embodiment of a client application.

FIG. 2 illustrates one embodiment of a client application. As shown, client application 18 includes initialization code 32, discovery scan function 34 and discovery callback procedure 36. Initialization code 32 initializes client application 18 at start up time of client application 18, including in particular, properly initializing client application 18 to perform the server application discovery process in accordance to the present invention. Discovery scan function 34 performs the actual scanning for server applications, utilizing the services provided by client discovery service 20. For the illustrated embodiment, discovery scan function 34 supports performing a full scan of all interested targets or a quick scan of only those interested target previously responded. The full scan is typically performed at start up as an integral part of the initialization process without requiring user interactions, whereas the quick scan is typically performed at a subsequent point in time in response to a specific user request. Discovery callback procedure 36 performs post discovery processing when a server application is discovered. The operational steps of these functions 32–36 including the way they utilize client discovery service 20 and the manner they cooperate with each will be described in more detail below.

Client application 18 also includes full target list 38 and current target address structure 42. Preferably, client application 18 further includes responded target list 40 and exception list 44. Full target list 38 comprises the network addresses of the server nodes 14a–14b, against which client application 18 is interested in discovering whether certain server applications are present on these server nodes 14a–14b. Current target address structure 42 contains all the information necessary to send a discovery packet to the current target of interest, for examples, the Media Access Control (MAC) address, protocol type, connection state etc. Responded target list 40 contains the network addresses of the server nodes that have previously responded. Exception list 44 contains the identification information of the server nodes that have previously responded. These elements and the manner they are utilized will also be described in more detail below.

Figure 3:
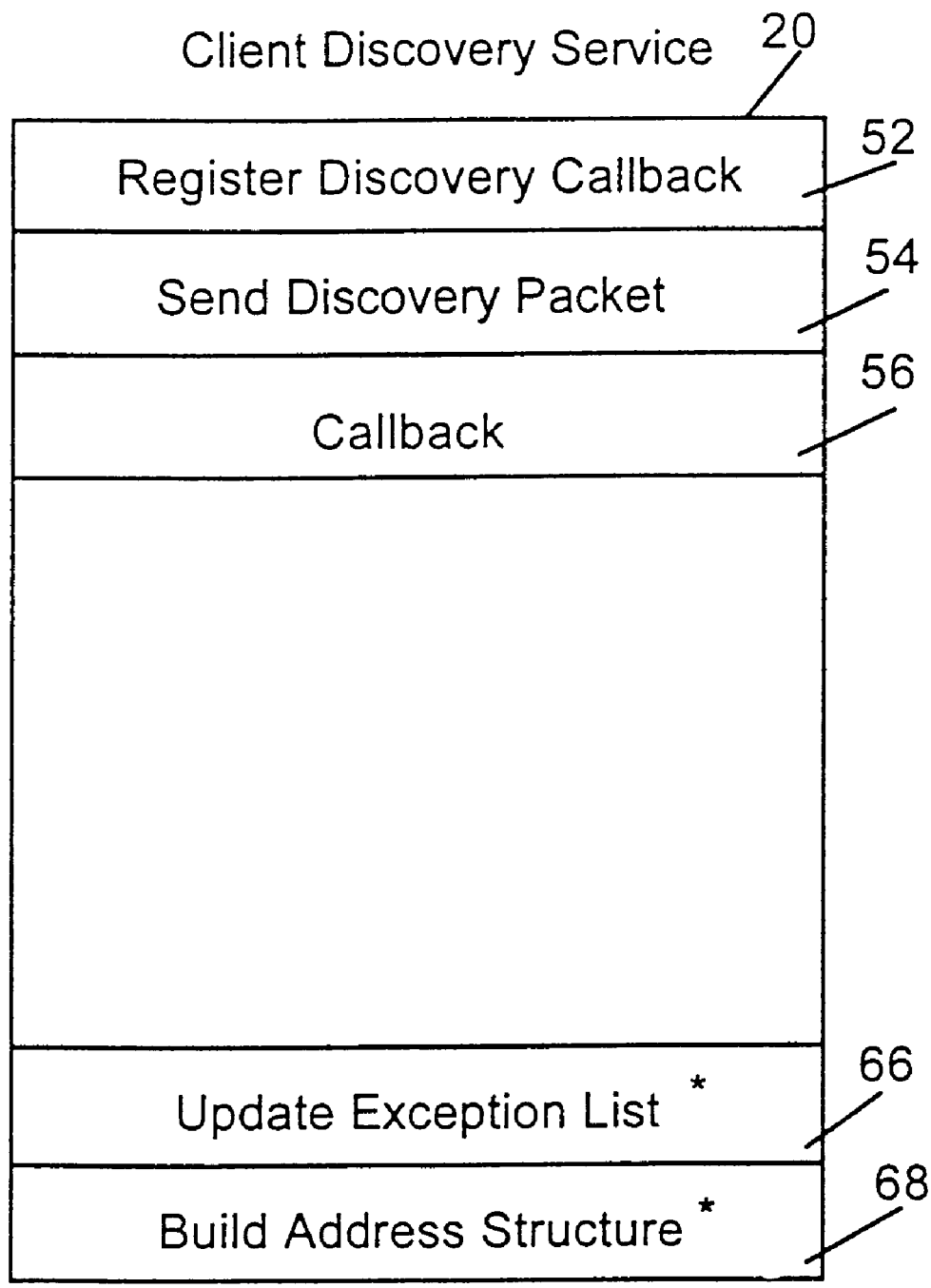
FIGS. 3–4 illustrate one embodiment each of a client discovery service and a server discovery service respectively.
Figure 4:
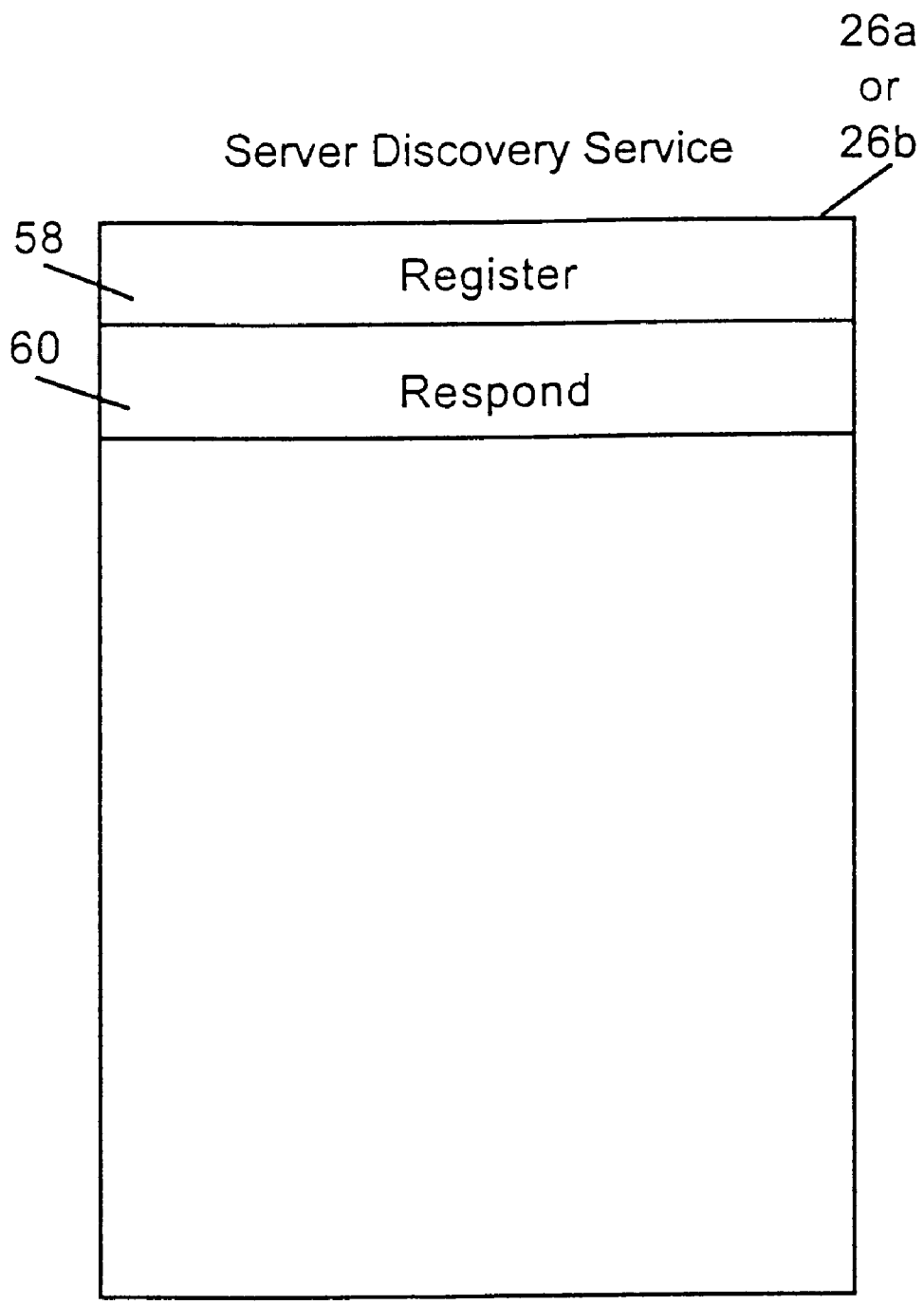

FIGS. 3–4 illustrate one embodiment each of a client discovery service and a server discovery service. As discussed earlier and shown in FIG. 3, client discovery service 20 includes a first registration function 52 for registering the discovery callback procedures of client applications 18, and a send discovery packet function 54 for sending discovery packets on behalf of the registered client applications 18. Additionally, client discovery service 20 includes a discovery callback function 56 for performing the callbacks when discovery response packets are received.

Still referring to FIG. 3, optionally, client discovery service 20 may also include build address structure function 68 for building an address structure for an interested target based on the target's network address, and update exception list function 66 for updating a client application's exception list 44.

As shown in FIG. 4, server discovery service 26a/26b includes a second registration function 58 for registering server applications that are interested in being discovered by client applications 18, and a respond function 60 for listening for discovery packets, and responding with discovery response packets on behalf of the registered server applications 24a/24b. The operating steps of these functions, and the manner they cooperate with each other will be described in more detail below.

Figure 5:
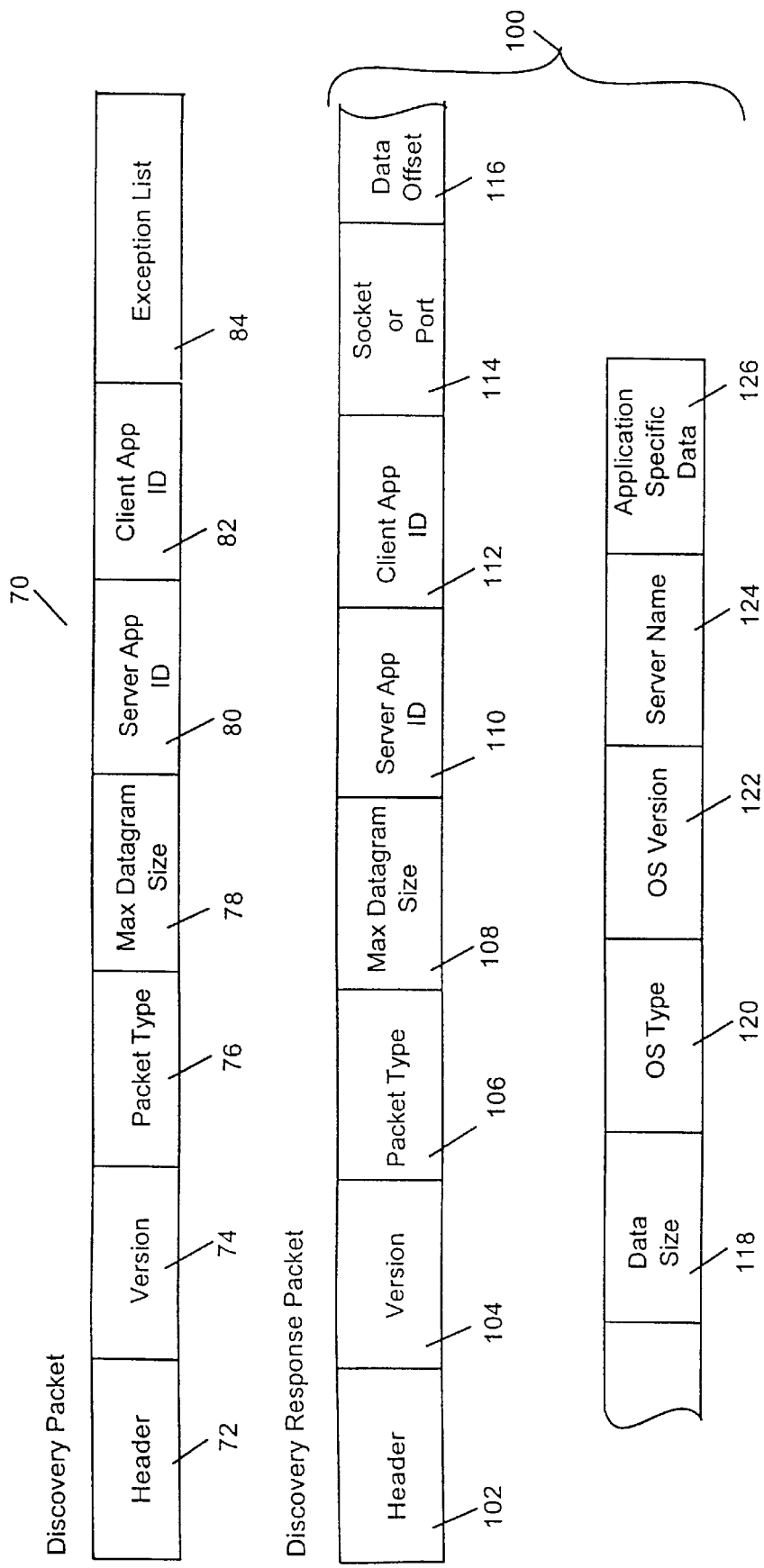
FIG. 5 illustrates one embodiment each of a discovery packet and a discovery response packet.

FIG. 5 illustrates one embodiment each of a discovery packet and a discovery response packet. As shown, for the illustrated embodiment, discovery packet 70 includes header 72, version 74, packet type 76, maximum datagram size 78, server application identifier 80, client application identifier 82, and exception list 84. Header 72 contains the protocol information, i.e. IPX, UDP/IP etc. Version 74 contains the version level of the discovery protocol. Packet type 76 contains the information identifying the packet as a discovery packet. Maximum datagram size 78 contains the smaller of the transport datagram size and the buffer size of an internal buffer employed by client discovery service 20 for receiving discovery response packets. Server application identifier 80 identifies the server application being discovered. Client application identifier 82 identifies the client application performing the discovery process. Finally, exception list 84 contains the network addresses who should not respond to the discovery packet. The usage of some of these fields, such as header 72, version 74 etc. are apparent to those skilled in the art, thus will not be further described. Usage for other fields, such as exception list 84 etc. will be described in more detail below.

For the illustrated embodiment, discovery response packet 100 includes, header 102, version 104, packet type 106, maximum datagram size 108, server application identifier 110, client application identifier 112, socket or port 114, data offset 116, data size 118, operating system type 120, operating system version 122, server name 124, and application specific data 126. Again, header 102 contains the protocol information, whereas version 104 identifies the discovery protocol level. Packet type 106 identifies the packet as a discovery response packet. Maximum datagram size 108 contains the maximum size that should not be exceeded by all subsequent datagrams from a client application 18 to the discovered server application 24a/24b (unless the client and server applications negotiate with each other for a larger datagram size). Server application identifier 110 and client application identifier 112 contain the same identification information as discovery packet 70. Socket or port 114 identifies a socket in the case of IPX, or a well known port in the case of UDP/IPX, for use in subsequent communication with the discovered server application 24a/24b. Data offset 116 is the offset from the beginning of the socket/port field to the beginning of the data field in discovery response packet 100. Data size 118 denotes the size of application specific data. Operating system type 120 and operating system version 122 identifies the operating system of server node 14a/14b. Server name 124 identifies server node 14a/14b. Application specific data 126, as the name suggests, contains application specific information that the discovered server application 24a/24b wants to communicate to the client application 18 performing the discovery process. The usage of these fields are all apparent to those skilled in the art, thus will not be further described.

Figure 6:
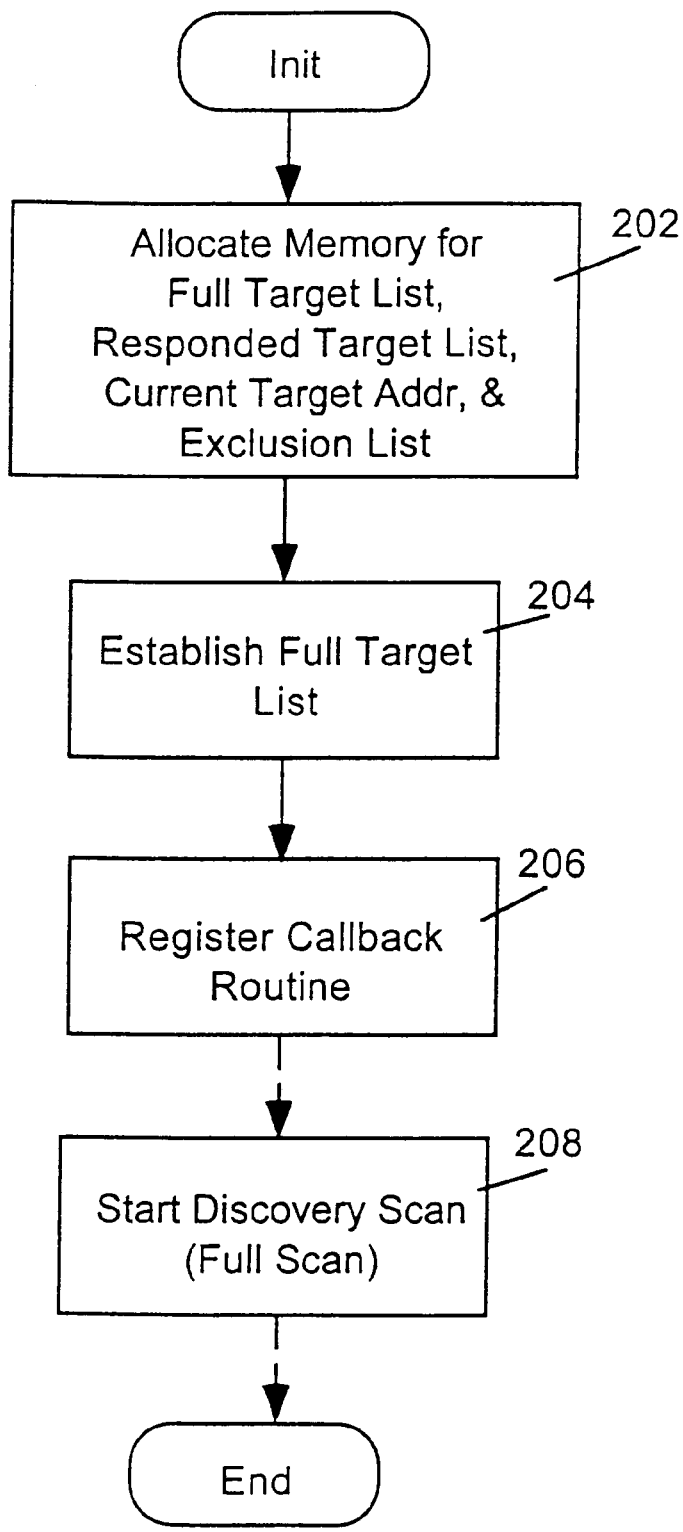
FIGS. 6–7 illustrate the essential initialization steps of one embodiment each of a client application and a server application respectively.
Figure 7:
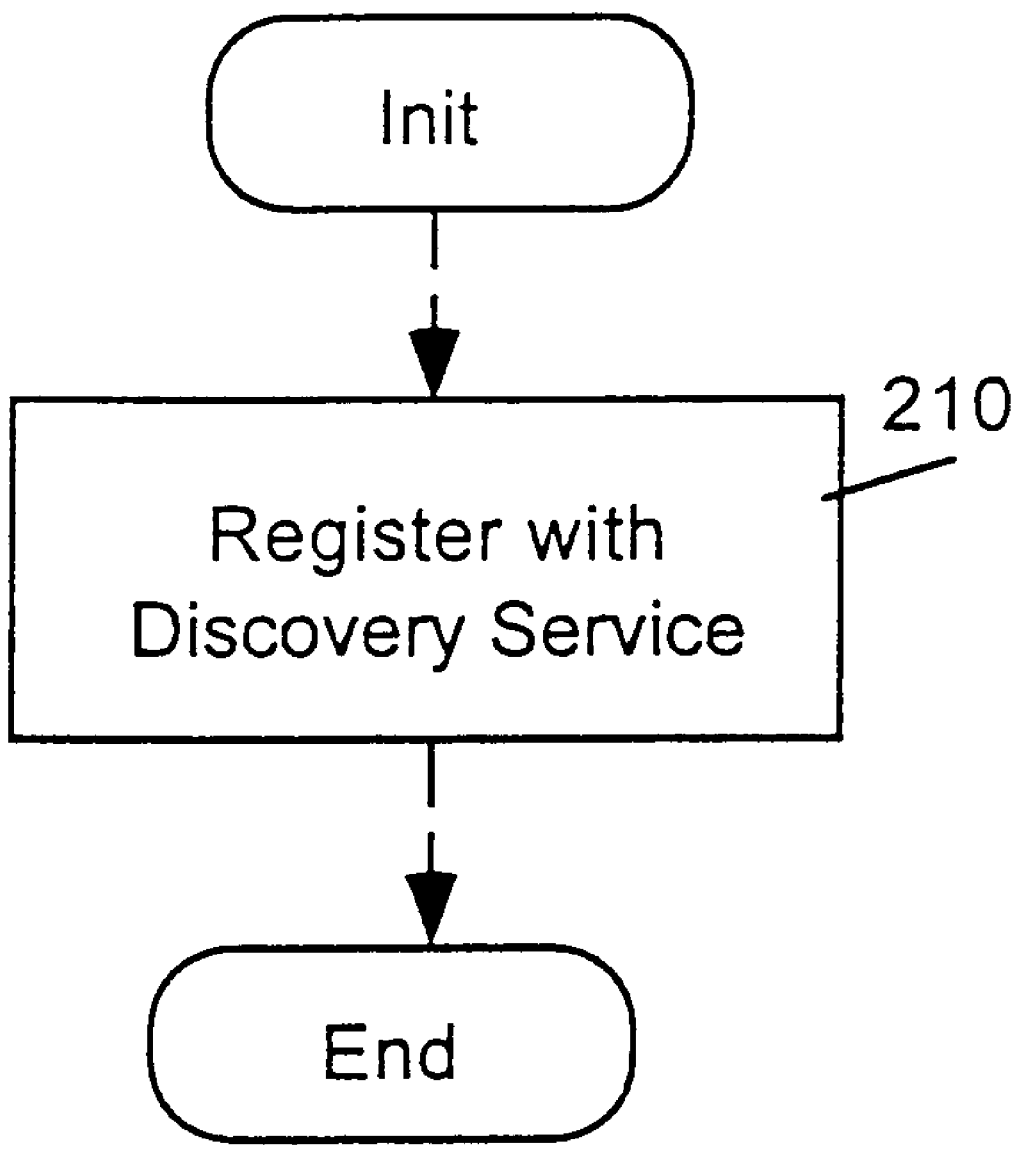

FIGS. 6–7 illustrate the essential initialization steps for one embodiment each of a client application and a server application. As shown in FIG. 6, in the course of initialization, e.g. during start up, client application 18 allocates memory or causes memory to be allocated (e.g. from an operating system service) for full target list 38, responded target list 40, current address structure 42 and exception list 44, step 202. Client application 18 further establishes the content of full target list 38, utilizing for examples a name service or a registry service in network 10, step 204. Client application 18 then calls first register function 52 to register its callback procedure 36 with client discovery service 20, step 206. As part of the registration process, client application 18 provides at least its identifier and the callback procedure's identifier to first registration function 52. Then, at an appropriate point or at the end of the initialization process (the timing is application dependent), client application 18 starts discovery scan 34, step 208. In one embodiment, client application 18 starts discovery scan 34 to perform a full discovery process against all interested targets.

As to server application 24a/24b, as shown in FIG. 7, in the course of initialization, server application 24a/24b calls second registration function 58 to register itself with server discovery services 26a/26b, step 210. As part of the registration process, server application 24a/24b provides at least its identifier, the socket or port through which a client application should conduct subsequent communication, and the maximum datagram size.

The operational steps of both registration functions 52 and 58 are readily apparent to those skilled in the art, thus they will not be further described.

Figure 8:
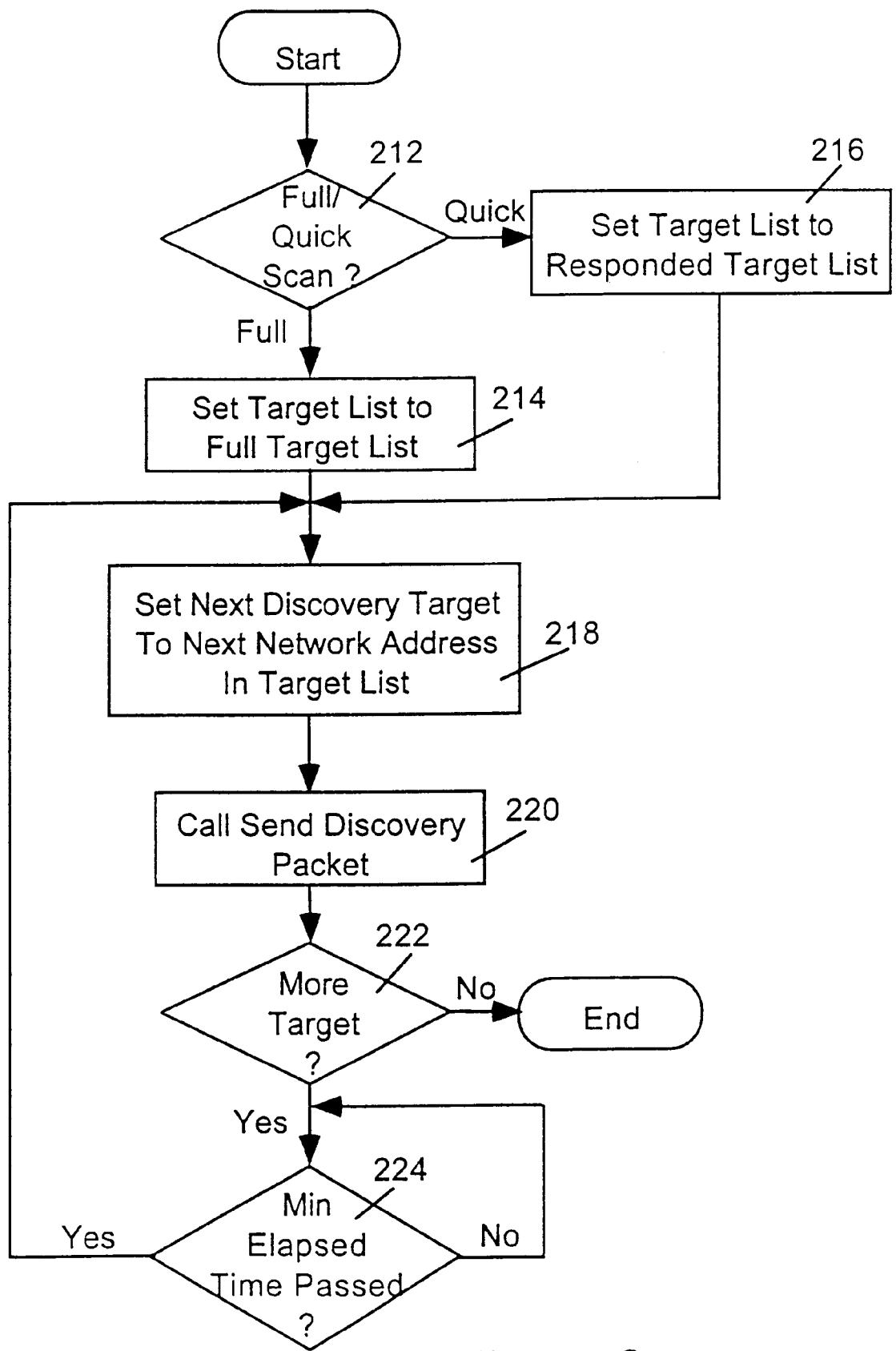
FIGS. 8–9 illustrate the operational steps of one embodiment each of the discovery scan function and the discovery callback function of a client application.

FIG. 8 illustrates the operational steps of one embodiment of the discovery function of a client application. As shown, upon invocation, discovery scan 34 determines whether it is to perform a full scan or a quick scan. If a full scan is to be performed, full target list 38 is set as the target list, step 214, whereas if a quick scan is to be performed, responded target list 40 is set as the target list, step 216. Next, for the illustrated embodiment, discovery scan 34 sets the next discovery target address to the next network address in the target list, step 218, and calls send discovery packet function 54 to send a discovery packet to the server node having the next network address, step 220. As part of the invocation of send discovery packet 54, discovery scan 34 provides send discovery packet function 54 with the next network address or a pointer to the next network address, and a pointer to its current target address structure 42. In an alternate embodiment where client discovery service 20 supports a separate build address structure function 68, discovery scan 34 calls the separate build address structure function 68 first, providing build address structure function 68 with the next network address and a pointer to the current target address structure 42, before calling send discovery packet function 54. In that case, discovery scan 34 only provides send discovery packet function 54 with a pointer to its current target address structure 42.

Discovery scan 34 repeats steps 218 and 210 for each network address in the target list, one network address at a time, until a discovery packet has been sent to each of the discovery targets. Additionally, in order to ensure the network traffic will not be bombarded with discovery and respond packets, discovery scan 34 will wait a predetermined amount of time before causing a discovery packet to be sent to another target. In one embodiment, discovery scan 34 waits at least 100 ms before causing a discovery packet to be sent to another network address.

In an alternate embodiment, instead of causing a discovery packet to be sent to one network address each time, discovery scan function 34 causes a discovery packet to be broadcast each time. For this embodiment, discovery scan function 34 provides a special network address to send discovery packet function 54. The special network address denotes that the discovery packet is to be broadcast for all interconnected nodes. Discovery scan function 34 would repeat the broadcast for a predetermined number of times (a small number). Most importantly, for each subsequent rebroadcast, discovery scan function 34 would provide send discovery packet function 54 with an exception list of all previously nodes to be included as part of the discovery packet. As discussed earlier, nodes identified in the exception list will not respond to the rebroadcast discovery packet, thereby reducing network traffic. Building up of exception list 44 will be described in more detail below.

Figure 10:
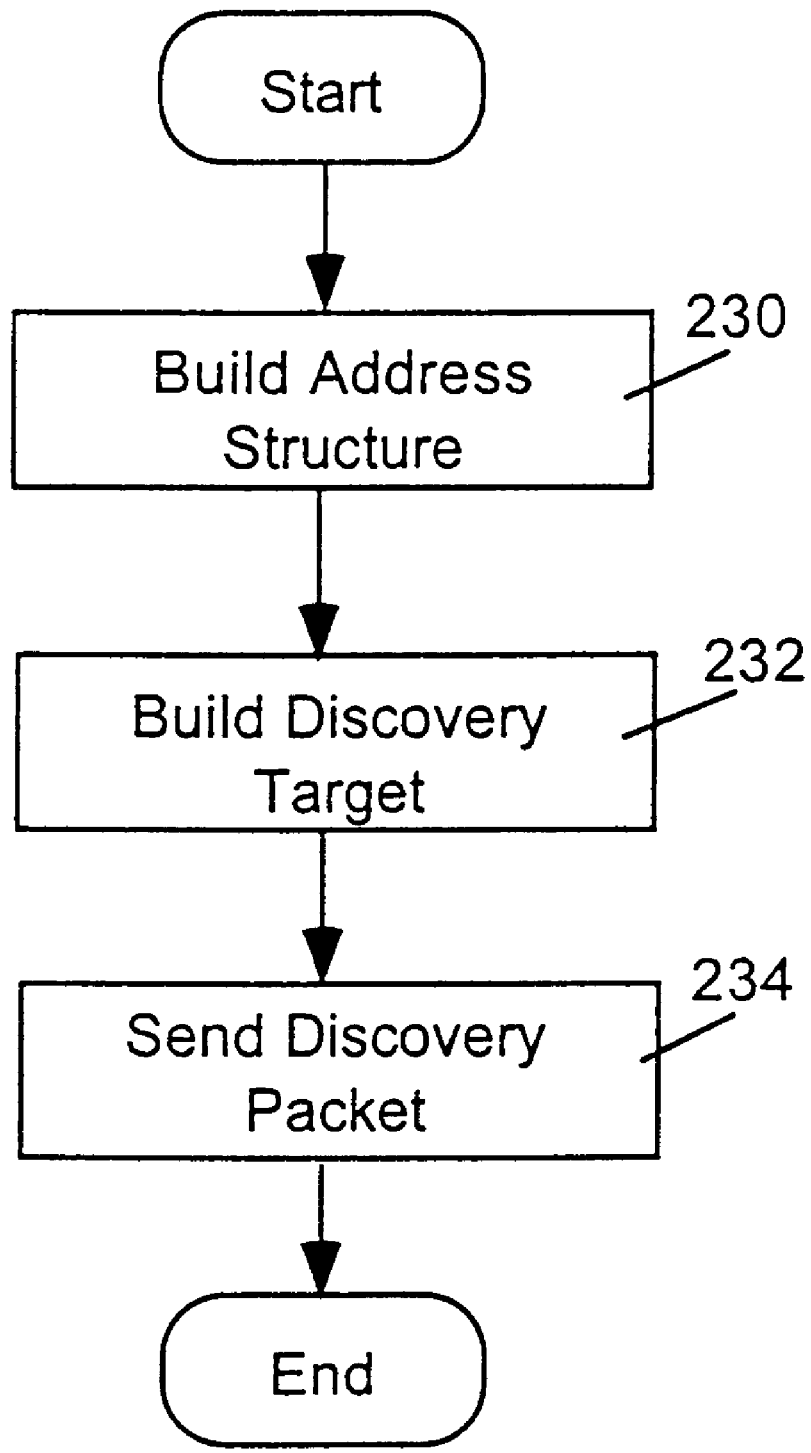
FIGS. 10–11 illustrate the operational steps of one embodiment each of the send discovery packet function and the callback function of a client discovery service.

Skipping now to FIG. 10, wherein the operational steps of one embodiment of the send discovery packet function are illustrated. As shown, upon invocation, send discovery packet function 54 builds up the address structure for the current target based on the next network address provided, step 230. In one embodiment, send discovery packet function 54 builds up the address structure in current target address structure 42 of client application 18. Next, send discovery packet function 54 builds up the discovery packet to be sent, step 232. Finally, send discovery packet function 54 sends the discovery packet to the addressed node using the service of transport layer 22. In the above described alternate embodiment where client discovery service 20 supports a separate build address structure function 68, send discovery packet function 54 skips step 230, and proceeds with step 232 directly.

Figure 12:
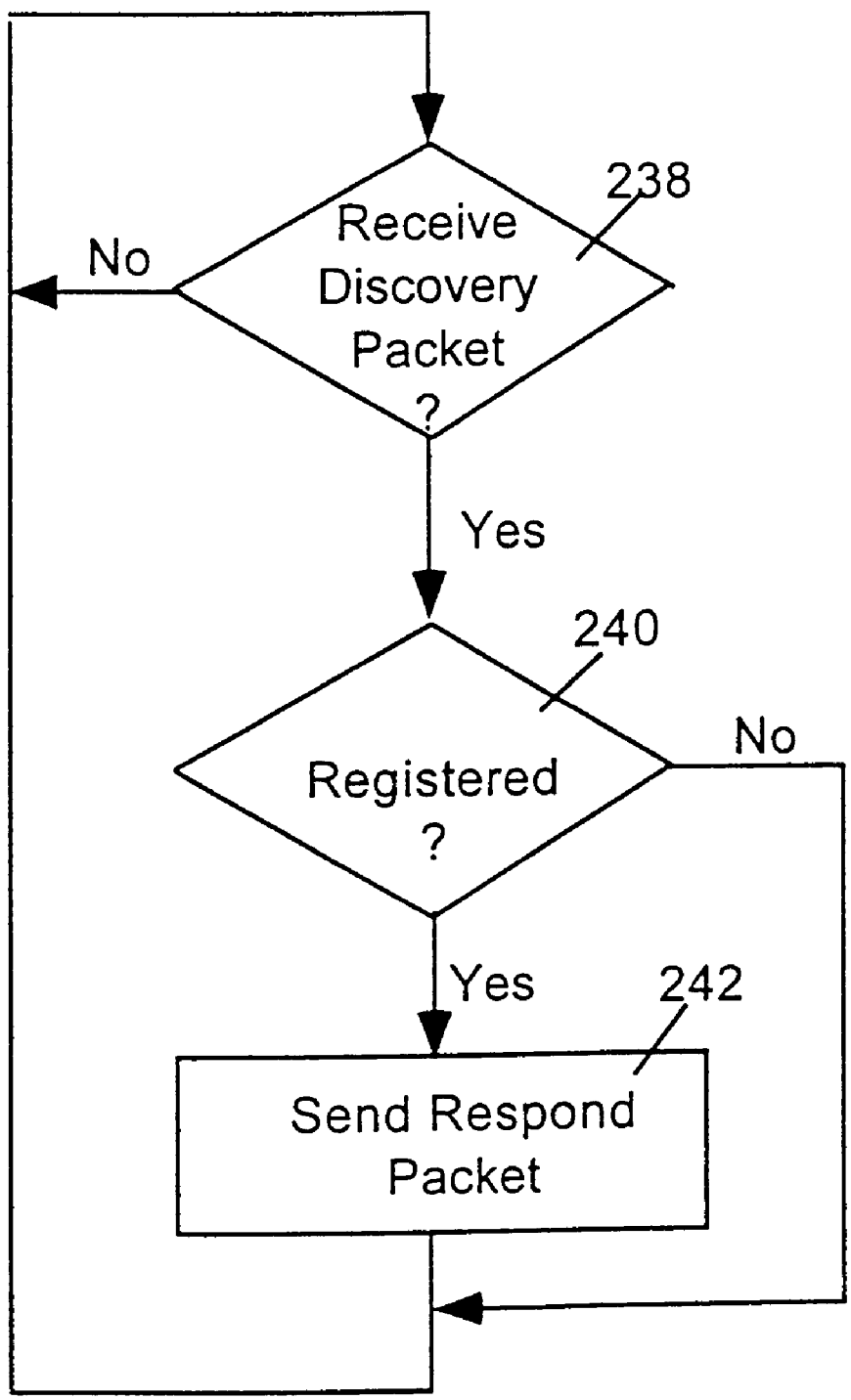
FIG. 12 illustrates the operational steps of one embodiment of the respond function of a server discovery service.

Skipping now to FIG. 12, wherein the operational steps of one embodiment of the respond function of a server discovery service are illustrated. As shown, respond function 60 continuously listens for discovery packets, step 238. As described earlier, respond function 60 listens for discovery packets at a well known socket or port. In one IPX embodiment, the well known socket is socket 8857h. In one UDP/IP embodiment, the well known port is port 9595h. Whenever a discovery packet is detected, respond function 60 determines if the server application of interest is one of the registered server applications, step 240. If the determination is affirmative, respond function 60 builds a discovery response packet, and send the discovery response packet to the originating client node, step 242.

Figure 11:
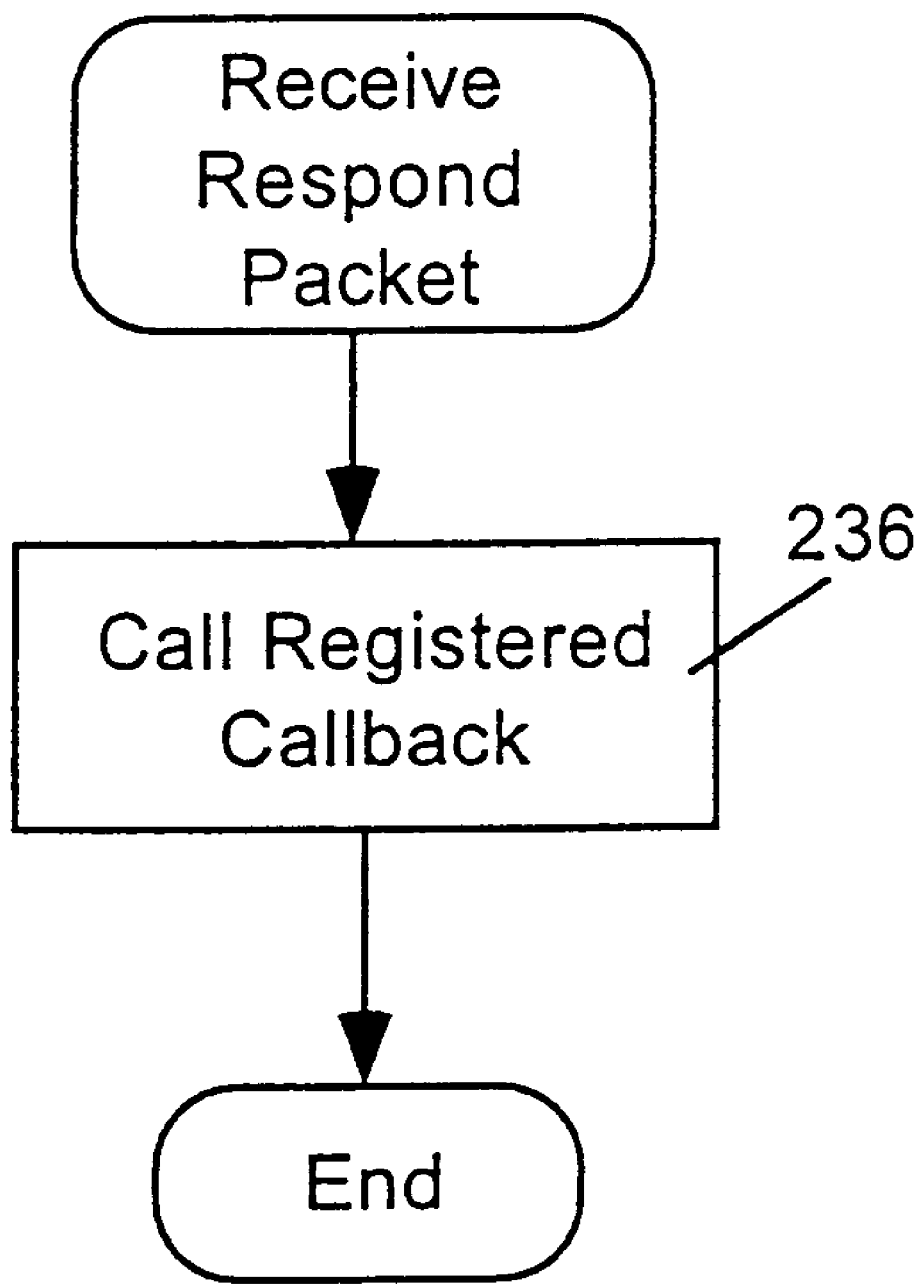

Referring now to FIG. 11, wherein the operational steps of one embodiment of the callback function of a client discovery service are illustrated. As described earlier, in response to the receipt of a discovery response packet, callback function 56 calls the registered callback function of the addressee client application, step 236. As described earlier, callback function 56 is forwarded the discovery response packet by transport layer 22, and callback function 56 is made aware of the discovery callback function 36 of the addressee client application 18 through the registration process.

Figure 9:
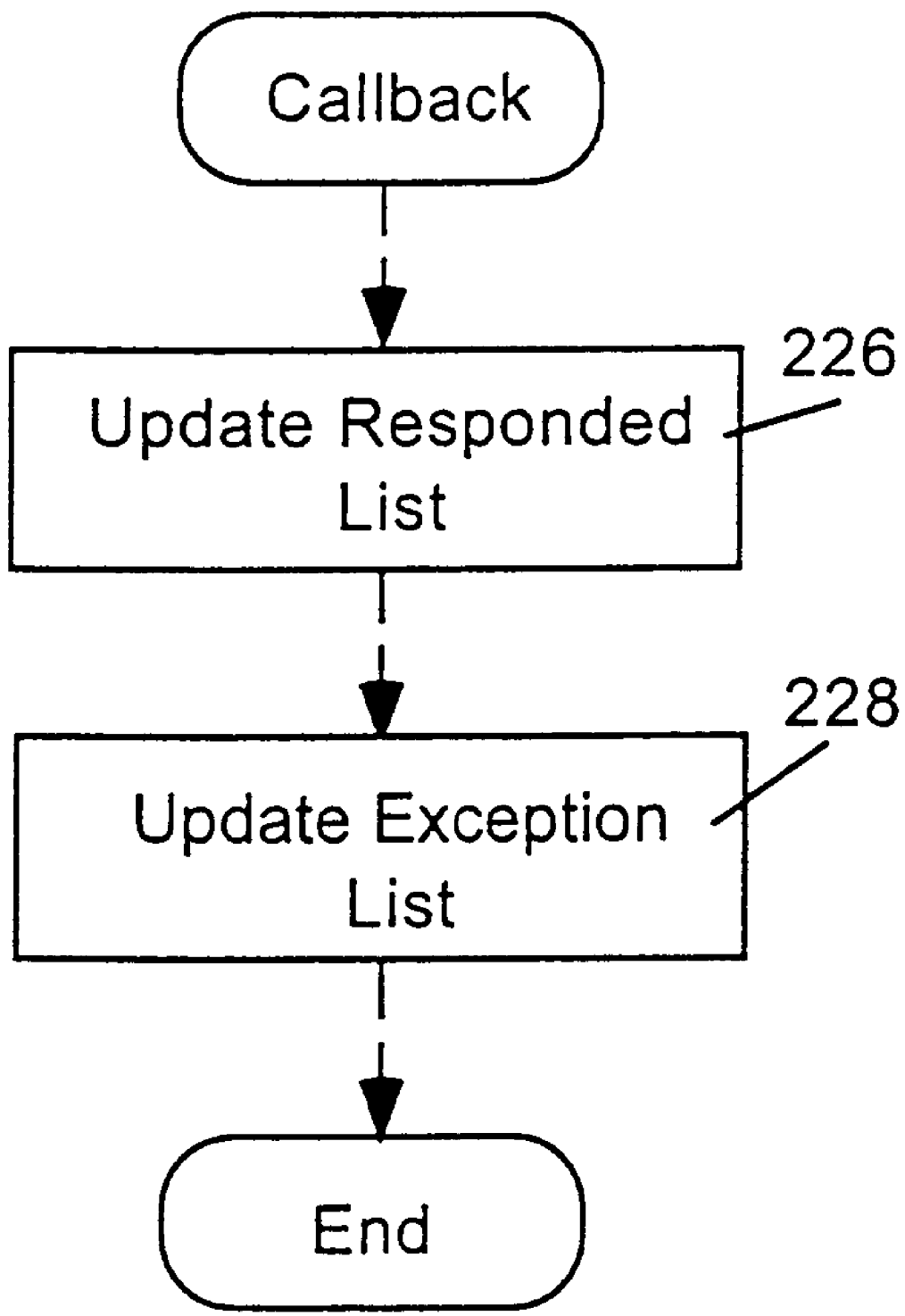

Referring now to FIG. 9, wherein the operational steps of one embodiment of the discovery callback function of a client application are illustrated. As shown, for the illustrated embodiment, the operational steps include updating responded target list 40, as well as updating exception list 44, steps 226 and 228. All other operational steps are application dependent. In an alternate embodiment where client discovery service 20 supports an update exception list function 66, discovery callback 36 calls update exception list function 66 to accomplish the update in step 226.

Thus, a method and apparatus for discovering server applications in a network of computer system have been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system comprising an independent client discovery service including a send discovery packet service that broadcasts discovery packets on demand to other computer systems interconnected with the computer system, on behalf and at the request of a client application of the computer system, to facilitate discovery by the client application as to whether a server application that is of interest to the client application is available on at least one of the other computer systems, wherein the independent client discovery service maintains an exception list for subsequent communications of discovery packets, the exception list including indications of nodes that responded to previously sent discovery packets, and further wherein re-sent discovery packets are not sent to nodes included in the exception list.

2. The computer system as set forth in claim 1, wherein each discovery packet further comprises a datagram size denoting the maximum datagram size to be used for a discovery response packet, to allow the client discovery service to employ a buffer with a buffer size that is smaller than a transport datagram size of a transport protocol employed to broadcast the discovery packet to receive the discovery response packet.

3. The computer system as set forth in claim 1, wherein the exception list includes a list of client applications, containing identification information of computer systems that should not reply to the discovery packet, the identified computer systems being previously replied computer systems.

4. The computer system as set forth in claim 3, wherein the client discovery service further includes an update exception list service that updates the exception list of the client application with the identification information of the previously replied computer systems.

5. The computer system as set forth in claim 1, wherein the discovery service further includes a discovery scan service that repeatedly invokes the send discovery packet service to broadcast discovery packets with the reply traffic reduction information to perform a series of discoveries for the client application without overloading the interconnections between the computer systems.

6. A computer system comprising an independent server discovery service including a respond service that listens for discovery packets broadcast on demand from other computer systems interconnected to the computer system, and replies to appropriate ones of the detected discovery packets with discovery response packets on behalf of a server application of the computer system interested in being discovered by client applications of the other computer systems, wherein the independent server discovery service replies to discovery packets having exception lists in which the computer system is not listed.

7. The computer system as set forth in claim 6, wherein the computer systems comprises a plurality of server applications interested in being discovered by client applications of the other computer systems, and the respond service listens for the discovery packets for all server applications at a common socket or port.

8. The computer system as set forth in claim 6 wherein, each discovery response packet further comprises a datagram size denoting the maximum datagram size to be used for subsequent communication with the server application.

9. The computer system as set forth in claim 8 wherein the discovery response packet further includes application specific data specific to the server application, an offset identifying a starting location for the application specific data, and a data size parameter specifying the size of the application specific data.

10. The computer system as set forth in claim 6, wherein each discovery packet includes an exception list of a client application on whose behalf the discovery packet is being sent, the exception list containing identification information of computer systems that should not reply to the discovery packet, the identified computer systems being previously responded computer systems.

11. A network of computer systems comprising:
(a) a client system having a client discovery service including a first registration service to register a notification mechanism of a client application of the client system, the client system further having a send discovery packet service to send discovery packets to a server system interconnected with the client system on demand, on behalf and at the request of the registered client application, wherein the client discovery service facilitates discovery of whether a server application that is of interest to the registered client application is available on the server system independent of the server application's knowledge of the client application; and (b) the server system, including a server discovery service having a second registration service to register a notification mechanism of the server application, wherein the registered server application is available to interested client applications of the client system, including client applications that the server application has no knowledge of, and a respond service to listen for discovery packets from the client discovery service(s) of the client system, and to reply to the detected discovery packets with discovery response packets on behalf of the registered server application, as appropriate.

12. The network of computer systems as set forth in claim 11, wherein each discovery packet comprises a datagram size denoting the maximum datagram size to be used for a discovery responsive packet, to allow the client discovery service of the first computer system to use a buffer with a buffer size smaller than a transport datagram size of a transport protocol employed to send the discovery packet to receive the discovery response packet.

13. The network of computer systems as set forth in claim 11, wherein the second computer includes a plurality of server applications interested to be discovered by client applications of the first computer system including client applications that the server applications have no knowledge of, and the respond function listens for the discovery packets for all server applications at a common socket or port.

14. The network of computer systems as set forth in claim 11 wherein each discovery response packet comprises a datagram size denoting the maximum datagram size to be used for subsequent communication with the server application.

15. The network of computer systems as set forth in claim 14 wherein the discovery response packet further includes application specific data specific to the server application, an offset identifying a starting location for the application specific data, and a data size parameter specifying the size of the application specific data.

16. The network of computer systems as set forth in claim 11, wherein the send discovery packet service of the independent client discovery service of the first computer system broadcasts each discovery packet to all computer systems interconnected with the first computer system, including the second computer system, including in each broadcast discovery packet information that facilitates reduction in reply traffic resulting from the broadcast by eliminating unnecessary cumulative replies.

17. The network of computer systems as set forth in claim 16, wherein the client discovery service of the first computer system further includes a discovery scan service that repeatedly invokes the send discovery packet service to broadcast discovery packets with the reply traffic reduction instructions to perform a series of discoveries for the client application without overloading the interconnections between the computer systems.

18. The network of computer systems as set forth in claim 16, wherein each discovery packet includes an exception list of the client application containing identification information of computer systems that should not reply to the discovery packet, the identified computer systems being previously replied computer systems.

19. The network of computer systems as set forth in claim 18, wherein the client discovery service of the first computer system further includes an update exception list service that updates the exception list of the client application with identification information of the previously responded computer systems.

20. The network of computer systems as set forth in claim 11, wherein the client discovery service of the first computer system further includes a discovery scan service that repeatedly invokes the send discovery packet service in a selected one of a plurality of manners to send discovery packets to a plurality of computer systems interconnected with the first computer system, including the second computer system, to perform a series of discoveries for the client application.

21. The network of computer systems as set forth in claim 20, wherein the plurality of manners of repeated invocations of the send discovery packet service of the client discovery service of the first computer system include a first manner where the send discovery packet service is repeatedly invoked to build and send discovery packets to a first list of other computer systems including the second computer system, these other computer systems being included in the first list based on the client application's interest independent of whether these computer systems having previously responded or not, and a second manner where the send discovery packet service is repeatedly invoked to build and send discovery packets to a second list of other computer systems including the second computer system, these other computer systems being included in the second list based on the client application's interest and that these other computer systems having previously responded.

22. The network of computer systems as set forth in claim 21, wherein the client discovery service of the first computer system further includes a build address structure service that builds a current address structure for a computer system of either the first or the second list of other computer systems, the current address structure containing information for communicating with the particular computer system.

23. In a network of computer systems, a computer implemented method for discovering a server application by a client application independent of the server application's knowledge, if any, of the client application, the method comprising:

a) the client application independently registering its notification mechanism with an independent client discovery service;

b) the independent client discovery service sending a discovery packet on demand, on behalf and at the request of the client application;

c) the server application independently registering its notification mechanism with an independent server discovery service;

d) the server discovery service listening for the discovery packet, and replying with a discovery response packet on behalf of the server application, independent of the server application's knowledge, if any, of the client application; and e) the client discovery service by way of the registered notification mechanism of the client application notifying the client application of the receipt of the discovery response packet.

24. The method as set forth in claim 23, wherein (b) comprises the client discovery service sending a discovery packet to each of a plurality of computer systems, one computer systems at a time, waiting at least a predetermined amount of time between packets to avoid overloading the network.

25. The method as set forth in claim 24, wherein (b) is performed for previously responded computer systems only.

26. The method as set forth in claim 23, wherein (b) comprises the client discovery service repeatedly broadcast discovery packets, with each discovery packet including information that facilitates reduction in reply traffic resulting from the broadcast by eliminating unnecessary cumulative replies.

27. The method as set forth in claim 23, wherein the server discovery service services a plurality of server applications, and (d) comprises the server discovery service listening for discovery packets for all server applications at a common socket or port.

28. The method as set forth in claim 23, wherein the method further comprises (f) the registered notification mechanism of the client application updating a list with computer systems having responded to discovery packets previously sent.

29. The method as set forth in claim 23, wherein the method further comprises (f) the registered notification mechanism of the client application updating a list identifying computer systems that should not reply to future discovery packets that are broadcast.

30. The method as set forth in claim 23, wherein (b) comprises the client discovery service broadcasting each discovery packet with information that facilitates reduction in reply traffic resulting from the broadcast by eliminating unnecessary cumulative replies.

31. A computer system comprising an independent client discovery service including a send discovery packet service for building and sending a discovery packet on demand to another computer system interconnected with the computer system, on behalf and at the request of a client application of the computer system, to allow the client application to discover as to whether a server application that is of interest to the client application is available on the other computer system, and a discovery scan service for repeatedly invoking the send discovery packet service in a selected one of a plurality of manners to perform a series of discoveries for the client application, wherein the independent client discovery service maintains an exception list for subsequent communications of the discovery packets, the exception list including indications of nodes that responded to previously sent discovery packets, and further wherein re-sent discovery packets are not sent to nodes included in the exception list.

32. The computer system as set forth in claim 31 wherein the plurality of manners include a first manner where the send discovery packet service is repeatedly invoked to build and send discovery packets to a first list of other computer systems, these other computer systems being included in the first list based on the client application's interest independent of whether these computer systems having previously responded or not, and a second manner where the send discovery packet service is repeatedly invoked to build and send discovery packets to a second list of other computer systems, these other computer systems being included in the second list based on the client application's interest and that these other computer systems having previously responded.

33. A network medium having sequences of instructions stored therein, which when executed cause a client application of a client computer to discover a server application of a server computer by performing:

a) the client application independently registering its notification mechanism with a client discovery service on the client computer;

b) the client discovery service sending a discovery packet on demand, on behalf and at the request of the registered client application over the network;

c) the server application independently registering its notification mechanism with a server discovery service on the server computer;

d) the server discovery service listening for the discovery packet over the network, and replying with a discovery response packet on behalf of the registered server application, as appropriate, independent of the server application's knowledge of the client application; and e) the client discovery service by way of the registered notification mechanism of the client application notifying the registered client application of the receipt of the discovery response packet.

34. The network medium set forth in claim 33, wherein (b) comprises the client discovery service sending a discovery packet to each of a plurality of computer systems over the network, one computer system at a time, waiting at least a predetermined amount of time between packets to avoid overloading the network.

35. The network medium set forth in claim 34, wherein (b) is performed for previously responded computer systems only.

36. The network medium set forth in claim 33, wherein (b) comprises the client discovery service repeatedly broadcasting discovery packets, with each discovery packet including information that facilitates reduction in reply traffic resulting from the broadcast by eliminating unnecessary cumulative replies.

37. The network medium set forth in claim 33, wherein the server discovery service services a plurality of server applications, and (d) comprises the server discovery service listening for discovery packets for all server applications at a common socket or port.

38. The network medium set forth in claim 33, further comprising (f) the registered notification mechanism of the client application updating a list with computer systems having responded to discovery packets previously sent.

39. The network medium set forth in claim 33, further comprising (f) the registered notification mechanism of the client application updating a list identifying computer systems that should not reply to future discovery packets that are broadcast.

40. The network medium set forth in claim 33, wherein (b) comprises the client discovery service broadcasting each discovery packet with information that facilitates reduction in reply traffic resulting from the broadcast by eliminating unnecessary cumulative replies.

* * * * *

UNITED STATES PATENT AND TRADEMARK OFFICE
CERTIFICATE OF CORRECTION

PATENT NO.    : 6,101,528
DATED         : August 8, 2000
INVENTOR(S)   : Butt et al.

It is certified that error appears in the above-identified patent and that said Letters Patent is hereby corrected as shown below:

<u>Title page,</u>
Item [19], delete "Butt" and insert -- Butt, et al. --.
Item [75], delete "Utah" and insert -- ;Michael Day, American Fork, both of Utah --.

<u>Column 1,</u>
Line 34, delete "traffics" and insert -- traffic --.

<u>Column 3,</u>
Line 33, delete "to" and insert -- with --.
Line 47, delete "each other other" and insert -- each other --.

Signed and Sealed this

Third Day of September, 2002

Attest:

Attesting Officer

JAMES E. ROGAN
*Director of the United States Patent and Trademark Office*